United States Patent
Chiu et al.

(10) Patent No.: US 12,045,962 B2
(45) Date of Patent: Jul. 23, 2024

(54) TEST RESULT RECOGNIZING METHOD AND TEST RESULT RECOGNIZING DEVICE

(71) Applicant: Acer Incorporated, New Taipei (TW)

(72) Inventors: Sheng-Lin Chiu, New Taipei (TW); Cheng-Tse Wu, New Taipei (TW); An-Cheng Lee, New Taipei (TW); Wei-Ren Lin, New Taipei (TW); Ying-Shih Hung, New Taipei (TW)

(73) Assignee: Acer Incorporated, New Taipei (TW)

( * ) Notice: Subject to any disclaimer, the term of this patent is extended or adjusted under 35 U.S.C. 154(b) by 139 days.

(21) Appl. No.: 17/830,371

(22) Filed: Jun. 2, 2022

(65) Prior Publication Data
US 2023/0196521 A1 Jun. 22, 2023

(30) Foreign Application Priority Data
Dec. 16, 2021 (TW) ................................ 110147106

(51) Int. Cl.
| | |
|---|---|
| G06T 5/77 | (2024.01) |
| G06T 7/00 | (2017.01) |
| G06T 7/11 | (2017.01) |
| G06V 30/148 | (2022.01) |
| G06V 30/18 | (2022.01) |
| H04N 9/64 | (2023.01) |
| H04N 23/73 | (2023.01) |

(52) U.S. Cl.
CPC .............. *G06T 5/77* (2024.01); *G06T 7/001* (2013.01); *G06T 7/11* (2017.01); *G06V 30/148* (2022.01);
(Continued)

(58) Field of Classification Search
CPC . G06T 5/005; G06T 7/001; G06T 7/11; G06T 2207/10024; G06T 2207/30108;
(Continued)

(56) References Cited

U.S. PATENT DOCUMENTS

| | | | |
|---|---|---|---|
| 7,222,306 B2 * | 5/2007 | Kaasila | H04M 1/72445 715/800 |
| 2006/0045374 A1 * | 3/2006 | Kim | G06V 30/1478 382/255 |

(Continued)

FOREIGN PATENT DOCUMENTS

| | | |
|---|---|---|
| CN | 102136064 | 7/2011 |
| CN | 111047723 | 1/2021 |

(Continued)

*Primary Examiner* — Michael Lee
(74) *Attorney, Agent, or Firm* — JCIPRNET

(57) ABSTRACT

The disclosure provides a test result recognizing method and a test result recognizing device. The method includes: controlling an image-capturing device to capture a first image of a display screen according to an image-capturing parameter; in response to determining that a reference image area including a first designated character string exists in the first image, controlling the image-capturing device to capture a first test image of the display screen according to the image-capturing parameter; extracting a first image area corresponding to the reference image area from the first test image, and performing a text dividing operation on the first image area to convert the first image area into a second image area; and performing a text recognition operation on the second image area to obtain a first test result corresponding to the first test image.

14 Claims, 5 Drawing Sheets

```
┌──────────────────────────────────────────────┐
│ The image-capturing device is controlled to  │
│ capture a first image of the display screen  │── S210
│ of the display device to be tested according │
│ to the image-capturing parameters            │
└──────────────────────────────────────────────┘
                       ↓
┌──────────────────────────────────────────────┐
│ In response to determining that a reference  │
│ image area including the first designated    │
│ character string exists in the first image,  │── S220
│ the image-capturing device is controlled to  │
│ capture the first test image of the display  │
│ screen of the display device to be tested    │
│ according to the image-capturing parameters  │
└──────────────────────────────────────────────┘
                       ↓
┌──────────────────────────────────────────────┐
│ A first image area corresponding to the      │
│ reference image area is extracted from the   │
│ first test image, and a text dividing        │── S230
│ operation is performed on the first image    │
│ area to convert the first image area into a  │
│ second image area                            │
└──────────────────────────────────────────────┘
                       ↓
┌──────────────────────────────────────────────┐
│ A text recognition operation is performed on │
│ the second image area to obtain a first test │── S240
│ result corresponding to the first test image │
└──────────────────────────────────────────────┘
```

(52) U.S. Cl.
CPC ....... *G06V 30/18105* (2022.01); *H04N 9/646* (2013.01); *H04N 23/73* (2023.01); *G06T 2207/10024* (2013.01); *G06T 2207/30108* (2013.01)

(58) Field of Classification Search
CPC .......... G06V 30/148; G06V 30/18105; H04N 9/646; H04N 23/73; H04N 23/60
See application file for complete search history.

(56) References Cited

U.S. PATENT DOCUMENTS

| | | | |
|---|---|---|---|
| 2008/0284863 A1* | 11/2008 | Fujiwara | G11B 27/28 348/E5.025 |
| 2009/0316999 A1* | 12/2009 | Kim | G06V 30/268 382/209 |
| 2015/0379300 A1* | 12/2015 | Terada | G06V 30/416 726/28 |
| 2017/0021765 A1* | 1/2017 | Mori | B60R 1/00 |
| 2017/0195881 A1* | 7/2017 | Nishida | H04W 8/24 |
| 2017/0235372 A1 | 8/2017 | Song et al. | |
| 2018/0025222 A1* | 1/2018 | Yellapragada | G06V 30/416 382/176 |
| 2018/0053046 A1* | 2/2018 | Barton | G06Q 40/12 |

FOREIGN PATENT DOCUMENTS

| | | |
|---|---|---|
| CN | 113099100 | 7/2021 |
| TW | I262454 | 9/2006 |

\* cited by examiner

TEST RESULT RECOGNIZING METHOD AND TEST RESULT RECOGNIZING DEVICE

CROSS-REFERENCE TO RELATED APPLICATION

This application claims the priority benefit of Taiwan application serial no. 110147106, filed on Dec. 16, 2021. The entirety of the above-mentioned patent application is hereby incorporated by reference herein and made a part of this specification.

BACKGROUND

Technical Field

The present disclosure relates to an image recognition technology, particularly to a test result recognizing method and a test result recognizing device.

Description of Related Art

In the prior art, when a display device displays a test screen, the display device can also display the current display parameters like frame per second (FPS) on the test screen. In this test scenario, the test screen may be captured by an image-capturing device, and the captured image may be further analyzed/recognized by another test device to obtain the display parameters.

However, in the above scenario, the test device often fails to obtain good image recognition/analysis results during the image analysis/recognition process due to poor image quality.

SUMMARY

In view of this, the disclosure provides a test result recognizing method and a test result recognizing device, which may be adapted to solve the technical problem.

The disclosure provides a test result recognizing method adapted for a test result recognizing device, including: controlling an image-capturing device to capture a first image of a display screen of a display device to be tested according to at least one image-capturing parameter, wherein the display screen of the display device to be tested comprises a first designated character string; in response to determining that a reference image area including the first designated character string exists in the first image, controlling the image-capturing device to capture a first test image of the display screen of the display device to be tested according to at least one image-capturing parameter; extracting a first image area corresponding to the reference image area from the first test image, and performing a text dividing operation on the first image area to convert the first image area into a second image area; and performing a text recognition operation on the second image area to obtain a first test result corresponding to the first test image.

The disclosure provides a test result recognizing device, which includes a storage circuit and a processor. The storage circuit stores a code. The processor is coupled to the storage circuit and accesses the code to: control an image-capturing device to capture a first image of a display screen of a display device to be tested according to at least one image-capturing parameter, wherein the display screen of the display device to be tested includes a first designated character string; in response to determining that a reference image area including the first designated character string exits in the first image, control the image-capturing device to capture a first test image of the display screen of the display device to be tested according to at least one image-capturing parameter; extract a first image area corresponding to the reference image area from the first test image, and perform a text dividing operation on the first image area to convert the first image area into a second image area; and perform a text recognition operation on the second image area to obtain a first test result corresponding to the first test image.

DESCRIPTION OF THE EMBODIMENTS

Figure 1:
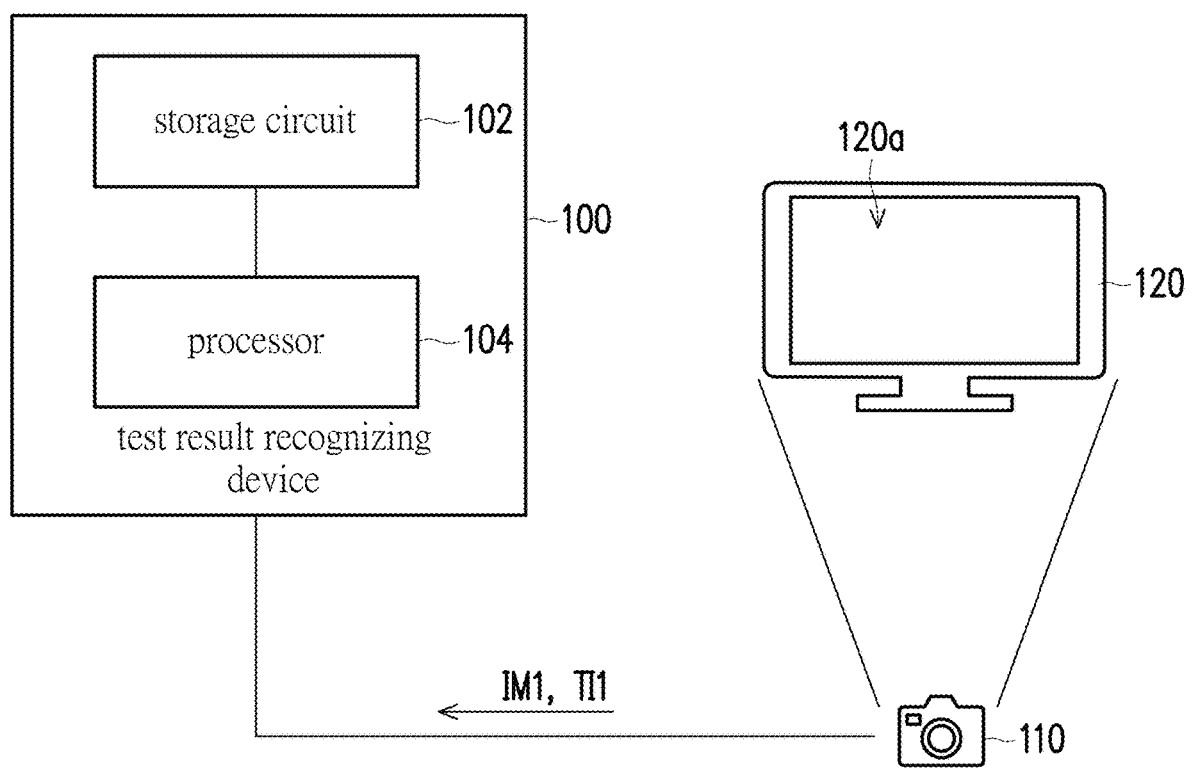
FIG. 1 is a schematic diagram of a test result recognizing device, an image-capturing device, and a display device to be tested according to an embodiment of the disclosure.

Please refer to FIG. 1, which is a schematic diagram of a test result recognizing device, an image-capturing device, and a display device to be tested according to an embodiment of the disclosure. In FIG. 1, the test result recognizing device 100 can be, for example, various computer devices and/or smart devices, and includes a storage circuit 102 and a processor 104.

The storage circuit 102 is, for example, any type of fixed or removable random access memory (RAM), read-only memory (ROM), flash memory, hard disk, other similar devices, or a combination of these devices, and it may be adapted to record multiple codes or modules.

The processor 104 is coupled to the storage circuit 102, and may be a general purpose processor, a special purpose processor, a traditional processor, a digital signal processor, multiple microprocessors, one or more microprocessor combined with digital signal processing core, controller, microcontroller, application specific integrated circuit (ASIC), field programmable gate array (FPGA), any other type of integrated circuit, state machines, processors based on Advanced RISC Machine (ARM), and other similar products.

In one embodiment, a display screen 120a of the display device 120 to be tested is adapted to display the test image stream, and the display screen 120a may additionally display related display parameters, such as FPS when displaying the test image stream, but it is not limited thereto.

In one embodiment, the test result recognizing device 100 is coupled to the image-capturing device 110 (which is, for example, a camera that has various lenses), and can control the image-capturing device 110 to capture images of the display screen 120a. After that, the test result recognition device 100 recognizes/analyzes the image captured by the image-capturing device 110 to obtain the relevant display parameters (such as the FPS mentioned above) of the display device 120 to be tested, but it is not limited thereto.

In the embodiment of the disclosure, the processor 104 accesses the modules and codes in the storage circuit 102 to implement the test result recognizing method proposed by the disclosure, and the details are described below.

Figure 2:
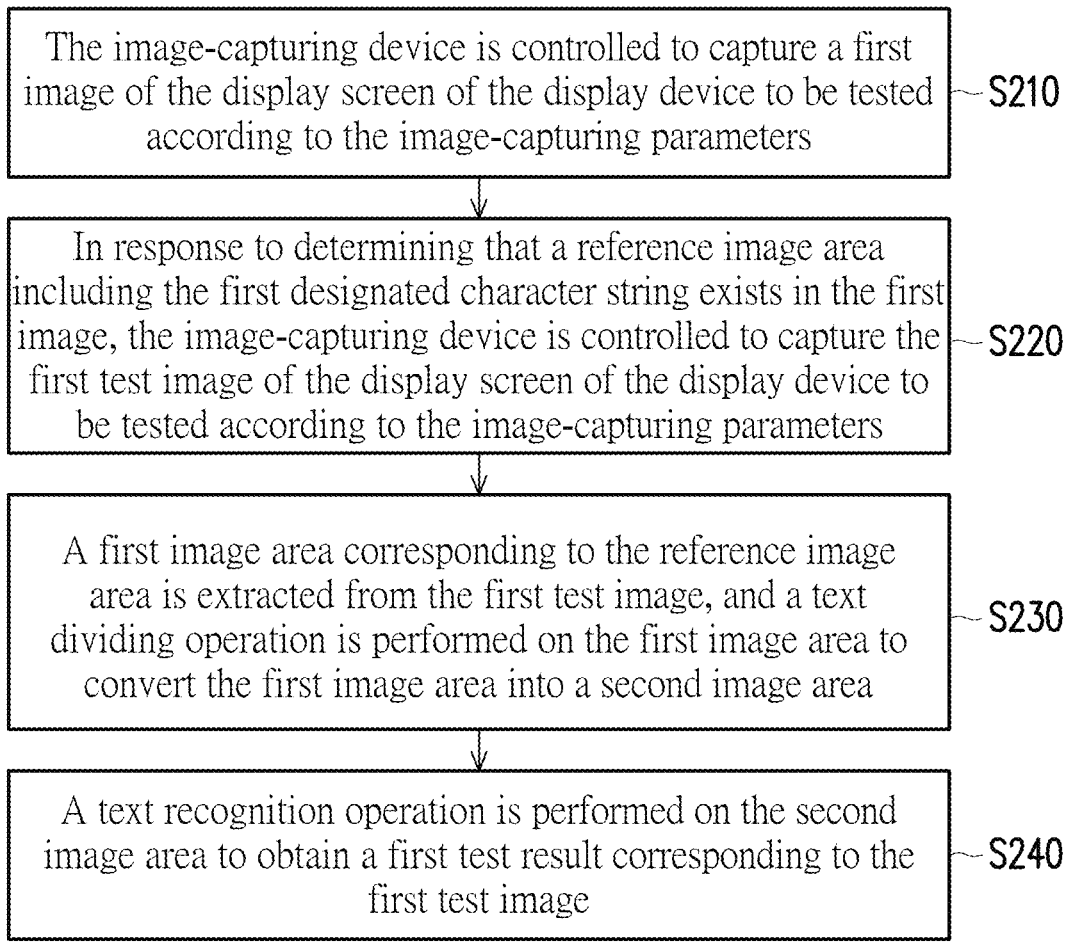
FIG. 2 is a flowchart of a test result recognizing method according to an embodiment of the disclosure.

Please refer to FIG. 2, which is a flowchart of a test result recognizing method according to an embodiment of the disclosure. The method of this embodiment may be executed by the test result recognizing device 100 shown in FIG. 1. The steps in FIG. 2 are described as follows in detail using the elements shown in FIG. 1.

First, in step S210, the processor 104 controls the image-capturing device 110 to capture a first image IM1 of the display screen 120*a* of the display device 120 to be tested according to the image-capturing parameters. In a different embodiment, the image-capturing parameters include, for example, the exposure value of the image-capturing device 110, focus setting parameters, and zoom setting parameters.

Generally, the processor 104 learns the image quality of the first image IM1 based on whether or not the reference image area including the first designated character string is recognized in the first image IM1. If the reference image area including the first designated character string cannot be found in the first image IM1, it means that the quality of the first image IM1 is not good. In this case, the processor 104 may adjust the image-capturing parameters of the image-capturing device 110 accordingly (for example, by reducing the exposure value) and control the image-capturing device 110 to take images of the display screen 120*a* again according to the adjusted image-capturing parameters. The processor 104 repeatedly adjusts the image-capturing parameters of the image-capturing device 110 according to the above teachings until the reference image area including the first designated character string is recognized in the image captured by the image-capturing device 110, but it is not limited thereto.

In contrast, if the reference image area including the first designated character string is found in the first image IM1, it means that the quality of the first image IM1 is acceptable. In this case, the processor 104 controls the image-capturing device 110 to take one or more subsequent test images based on the current image-capturing parameters for further recognition of each test image, which is further described below.

In one embodiment, after obtaining the first image IM1, the processor 104 performs related preprocessing on the first image IM1 to improve the image quality of the first image IM1. In some embodiments, the preprocessing includes, for example, converting the first image IM1 into a binary image (such as a black-and-white image) and/or removing noise in the first image IM1 by process like median filtering, to which the disclosure is not limited thereto.

In an embodiment, after obtaining the (preprocessed) first image IM1, the processor 104 determines whether there is a reference image area including the first designated character string in the first image IM1.

In a different embodiment, the designer determines the pattern of the first designated string based on, for example, their requirements. For example, assuming that the display parameter under discussion is FPS, the designer can set the first designated string to "fps". In this case, the processor 104 determines whether there is a reference image area including "fps" in the first image IM1.

In one embodiment, the processor 104 performs an optical character recognition operation on the first image IM1 based on, for example, the optical character recognition library of Microsoft Corporation to find a plurality of text image areas in the first image IM1, in which each text image area includes at least one character string.

Then, the processor 104 determines whether the character string in any one of the text image areas includes the first designated character string. In one embodiment, in response to determining that one of the text image areas (hereinafter referred to as the first text image area) of the character string includes the first designated character string, the processor 104 determines that the first text image area is the reference image area in the first image IM1, from which it proceeds to execute step S220.

In contrast, in response to determining that the character string in each text image area does not include the first designated character string, the processor 104 determines that there is no image area including the first designated character string in the first image IM1. In one embodiment, in response to determining that there is no image area including the first designated character string in the first image IM1, the processor 104 adjusts the image-capturing parameters of the image-capturing device 110 (for example, reduce the exposure value) and controls the image-capturing device 110 to capture a second image of the display screen 120*a* of the display device 120 to be tested according to the adjusted image-capturing parameters. After that, the processor 104 then determines whether there is a reference image area including the first designated character string in the second image. If so, the processor 104 controls the image-capturing device 110 to capture the first test image TM1 of the display screen 120*a* of the display device 120 to be tested according to the image-capturing parameters.

Figure 3:
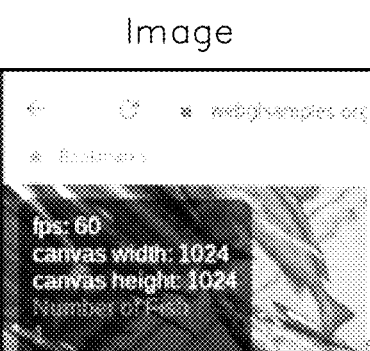
FIG. 3 is a schematic diagram of adjusting image-capturing parameters according to an embodiment of the disclosure.

To make the above concepts more comprehensible, please refer to FIG. 3 for further elaboration. FIG. 3 is a schematic diagram of adjusting image-capturing parameters according to an embodiment of the disclosure. In FIG. 3, it is assumed that the image-capturing device 110 captures the display screen 120*a* using the exposure value of −7 to obtain an image 311. It may be seen from the image 311 that it includes strings such as "fps: 60", "canvas width: 1024", and "canvas height: 1024". However, after the processor 104 performs preprocessing on the image 311 to generate the image 311*a*, the processor 104 may not be able to find any text image area from the image 311*a*. Therefore, the processor 104 controls the image-capturing device 110 to capture the display screen 120*a* again after reducing the exposure value to −8 to obtain the image 312.

In the scenario of FIG. 3, the above behavior may be repeated, until the processor 104 reduces the exposure value to −11. In this case, the processor 104 controls the image-capturing device 110 to capture the display screen 120*a* and then obtains the image 313. After that, the processor 104 preprocesses the image 313 to obtain the image 313*a*.

In one embodiment, the processor 104 performs the optical character recognition operation on the image 313*a* to find the text image areas 321 to 323 in the image 313*a*. In this embodiment, the text image area 321 includes the character string "fps: 53", the text image area 322 includes the character string "canvas width: 1024", and the text image area 323 includes the character string "canvas height: 1024", but it is not limited thereto.

In this case, since the text image area 321 includes the first designated character string (i.e., "fps"), the processor 104 determines that the text image area 321 is the reference image area in the image 313*a*, and proceeds to execute step S220 accordingly.

For the ease of description, the following assumes that the processor 104 can directly find the reference image area including the first designated character string in the first image IM1, but it is not limited thereto.

Therefore, in step S220, in response to determining that there is a reference image area including the first designated character string in the first image IM1, the processor 104 controls the image-capturing device 110 to capture the first test image TM1 of the display screen 120a of the display device 120 to be tested according to the image-capturing parameters. Take the scenario of FIG. 3 as an example; the processor 104 controls the image-capturing device 110 to capture the first test image TM1 of the display screen 120a of the display device 120 to be tested according to the exposure value of −11, but it is not limited thereto.

Next, in step S230, the processor 104 extracts a first image area corresponding to the reference image area from the first test image TM1, and performs a text dividing operation on the first image area to convert the first image area into a second image area.

In an embodiment, a first relative position of the reference image area and the first image IM1 corresponds to a second relative position of the first image area and the first test image TM1.

Take FIG. 3 as an example; the first image IM1 has the same pattern as the image 313a, and the corresponding reference image area is, for example, the text image area 321. In this case, it is assumed that the position of the text image area 321 in the first image IM1 is characterized as ((x1, y1), (x2, y2)), in which (x1, y1) are, for example, the coordinates of the upper left corner of the text image area 321 in the first image IM1 (which may be obtained in the optical character recognition operation mentioned above), and (x2, y2) are, for example, the coordinates of the upper right corner of the text image area 321 in the first image IM1 (which may also be obtained in the optical character recognition operation). Based on this, the processor 104 takes an area of ((x1, y1), (x2, y2)) from the first test image TM1 as the first image area.

Furthermore, since "fps" as the first designated string should be presented in the same position in the display screen 120a, the first image area obtained by the processor 104 through the above method will also include the character string "fps".

After obtaining the first image area, the processor 104 then performs a text dividing operation on it to convert the first image area into a second image area.

Figure 4:
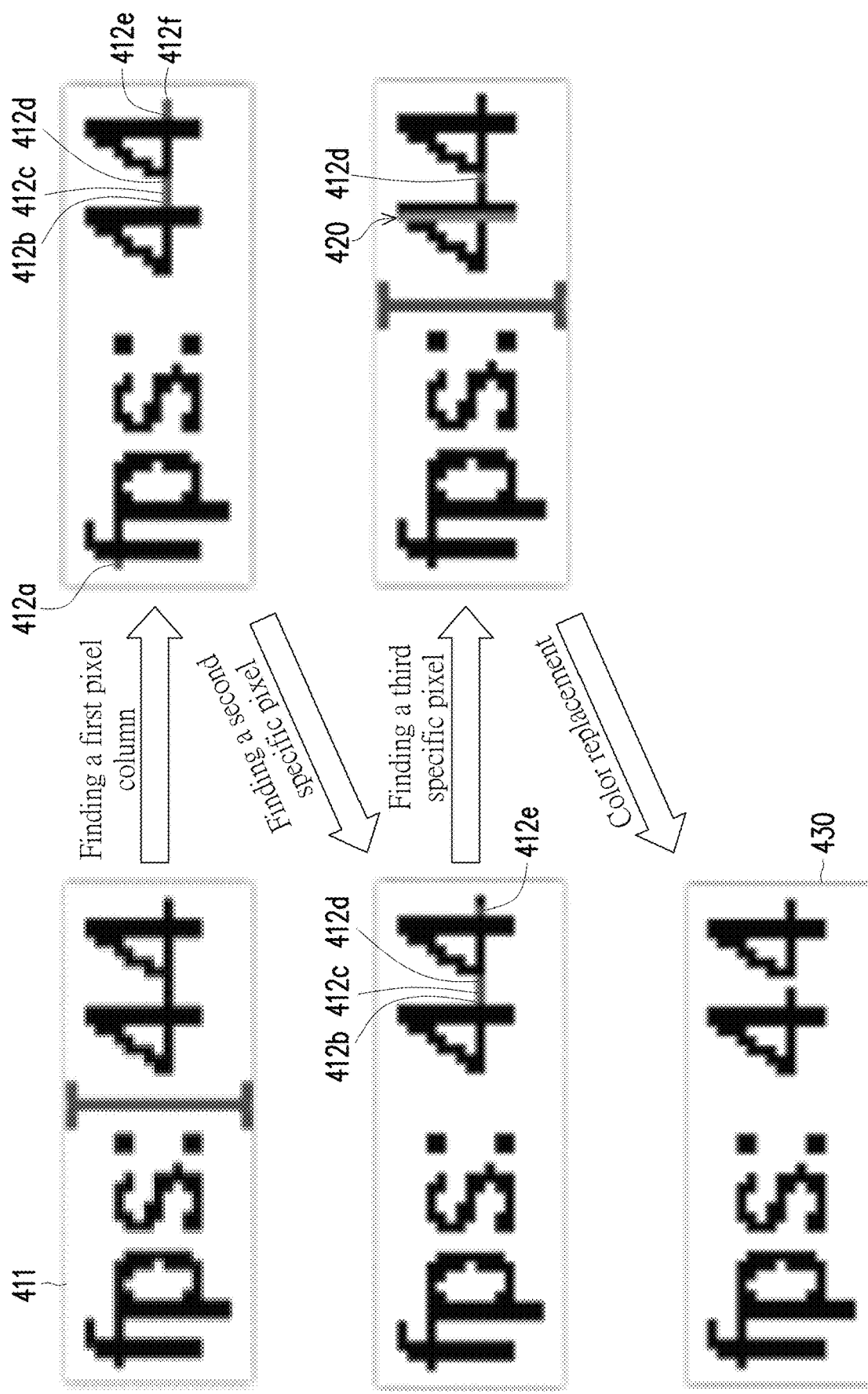
FIG. 4 is a schematic diagram of performing a text dividing operation according to the first embodiment of the disclosure.

Please refer to FIG. 4, which is a schematic diagram of performing a text dividing operation according to the first embodiment of the disclosure. In FIG. 4, it is assumed that the first image area obtained by the processor 104 is the first image area 411 as shown, and the character string included is, for example, "fps: 44". However, it can be seen from FIG. 4 that there is a line connecting the two characters "44" in the first image area 411, and it is possible for this line to lower the accuracy of the subsequent image recognition performed by the processor 104. Therefore, the embodiment of the disclosure divides the connected characters through the following mechanism.

In FIG. 4, the first image area 411 includes a plurality of pixel columns, and the processor 104 finds the first pixel column among these pixel columns. Each first pixel column includes a plurality of pixels, and only a single first specific pixel among the pixels in each first pixel column has a first designated color. In a different embodiment, the first designated color can be any color designated by the designer. For the ease of description, the following assumes that the first designated color is black, but it is not limited thereto. In this case, the processor 104 finds and takes a pixel column including only a single black pixel in the first image area 411 as the first pixel column. In FIG. 4, the first pixel column found by the processor 104 is, for example, a pixel column including pixels 412a to 412f (i.e., the first specific pixel), but it is not limited thereto.

Then, the processor 104 finds a second specific pixel among the first specific pixels in the first pixel columns, where adjacent pixels on both sides of each second specific pixel have the first designated color. In short, the processor 104 finds the second specific pixel among the pixels 412a to 412f, and the left and right pixels of the second specific pixel are all black. In the scenario of FIG. 4, the processor 104 finds and takes the pixels 412b to 412e from the pixels 412a to 412f as the second specific pixels, for example.

Then, the processor 104 finds the third specific pixel among the second specific pixels (i.e., pixels 412b to 412e). There is a specific pixel column on the designated side of each third specific pixel. The specific pixel column is separated from the corresponding third specific pixel by a predetermined number of rows. The specific pixel column includes N consecutive pixels with the first designated color, and N is a positive integer. In a different embodiment, N is a positive integer greater than half of the height of the first image area 411, but it is not limited thereto.

For the ease of description, it is assumed in FIG. 4 that the designated side is the left side, the predetermined number of rows is 4, and N is 7. In this case, if the fourth pixel column on the left of a certain pixel among the pixels 412b to 412e includes 7 consecutive black pixels, this pixel is defined by the processor 104 as the third specific pixel.

In FIG. 4, since the fourth pixel column (i.e., the pixel column 420) on the left side of the pixel 412d includes 7 consecutive black pixels, the processor 104 regards the pixel 412d as the third specific pixel, but it is not limited thereto.

Next, the processor 104 replaces each third specific pixel with a second designated color that is different from the first designated color. For example, the processor 104 replaces the original black pixel 412d with a white (i.e., the second designated color) pixel. In this way, the characters "44" in the first image area 411 are divided accordingly, converting the first image area 411 into the second image area 430.

Figure 5:
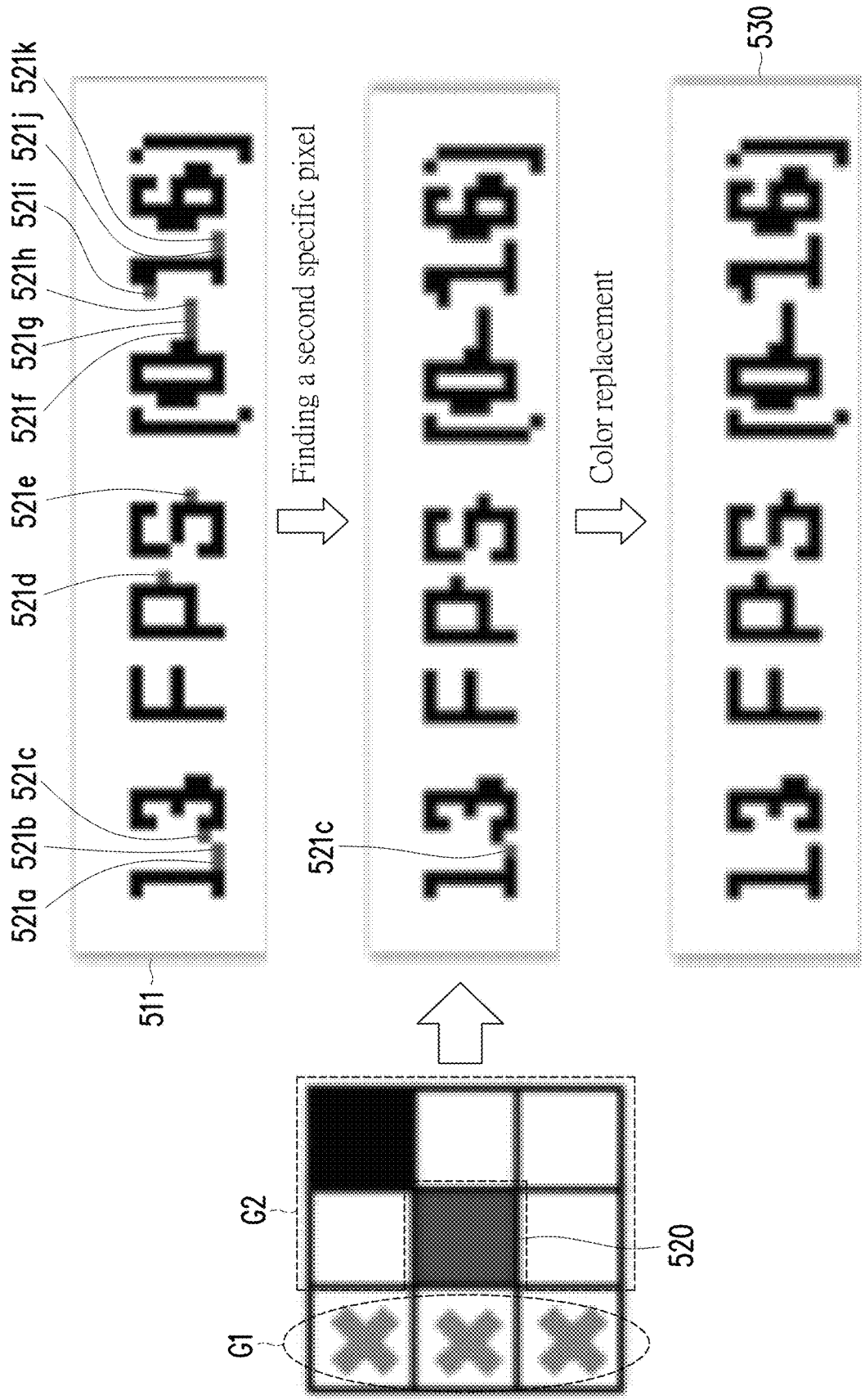
FIG. 5 is a schematic diagram of performing a text dividing operation according to the second embodiment of the disclosure.

Please refer to FIG. 5, which is a schematic diagram of performing a text dividing operation according to the second embodiment of the disclosure. In FIG. 5, it is assumed that the first image area obtained by the processor 104 is the first image area 411 as shown, and the character string included is, for example, "13 FPS (0-16)". However, it may be seen from FIG. 5 that there is a line connecting the characters "13" in the first image area 511, and it is possible for this line to lower the accuracy of the subsequent image recognition performed by the processor 104. Therefore, the embodiment of the disclosure divides the connected characters through the following mechanism.

In FIG. 5, the first image area 411 includes a plurality of pixel columns, and the processor 104 may find the first pixel column among these pixel columns, each first pixel column includes a plurality of pixels, and only a single first specific pixel in the pixels in each first pixel column has the first designated color, and the related details may be referred to the description of FIG. 4, which is not further mentioned here.

In FIG. 5, the first pixel column found by the processor 104 is, for example, pixel columns including pixels 512a to 512k (i.e., the first specific pixel), but it is not limited thereto. It may be seen from FIG. 5 that each pixel 512a to 512k has 8 surrounding pixels, and the processor 104 may find the fourth specific pixel from the pixels 512a to 512k based on the respective surrounding pixels of pixels 512a to 512k.

For example, for a certain first specific pixel 520, the processor 104 divides its eight surrounding pixels into a first group G1 and a second group G2. In FIG. 5, the first group G1 includes surrounding pixels on the upper left, left, and lower left of the first specific pixel 520, and the second group G2 includes surrounding pixels on the upper, upper right, right, and lower right of the first specific pixel 520.

After that, the processor 104 determines whether there is only one designated surrounding pixel in the second group G2 of the first specific pixel 520 that has the first designated color. In FIG. 5, the designated surrounding pixels are, for example, surrounding pixels at the upper right of the first specific pixel 520. That is, the processor 104 determines whether only the upper right surrounding pixel in the second group G2 of the first specific pixel 520 is black. If so, the processor 104 regards the first specific pixel 520 as the fourth specific pixel, and vice versa, it does not regard the first specific pixel 520 as the fourth specific pixel.

Among the pixels 512a to 512k (i.e., the first specific pixels) shown in FIG. 5, since only the pixel 512c meets the above conditions, the processor 104 regards the pixel 512c as the fourth specific pixel, but it is not limited thereto.

Then, the processor 104 replaces each fourth specific pixel with a second designated color different from the first designated color. For example, the processor 104 replaces the original black pixel 512c with a white (i.e., the second designated color) pixel. In this way, the characters "13" in the first image area 511 is divided accordingly, converting the first image area 511 into a second image area 530.

Please refer to FIG. 2 again. After converting the first image area into the second image area according to the above teaching, in step S240, the processor 104 performs a text recognition operation on the second image area to obtain a first test result corresponding to the first test image TM1. In a different embodiment, the processor 104 performs a text recognition operation on the second image area according to any existing image text recognition algorithm.

Take FIG. 4 as an example; the processor 104 performs a text recognition operation on the second image area 430 to obtain the first test result of "fps: 44". And take FIG. 5 as an example; the processor 104 performs a text recognition operation on the second image area 530 to obtain the first test result of "13 FPS (0-16)", but it is not limited thereto.

In some embodiments, after obtaining the first test result, the processor 104 further corrects the first test result to the second test result based on a text correction table.

In one embodiment, the text correction table includes a plurality of preset error recognition results and a plurality of corresponding preset correction results. In this case, in response to determining that the first test result corresponds to the first preset correction result among the preset correction results, the processor 104 finds the first preset correction result that corresponds to the first preset correction result among the preset correction results, and defines the first preset correction result as the second test result.

To make the above concepts more comprehensible, the text correction table is supplemented as Table 1 below for further explanation.

TABLE 1

| Preset Recognition Result | Preset Correction Result |
|---|---|
| tps | fps |
| fps, | fps: |

TABLE 1-continued

| Preset Recognition Result | Preset Correction Result |
|---|---|
| fps. | fps: |
| fps! | fps: |
| B | 8 |
| S | 5 |
| ? | 7 |
| 1 | 1 |
| g | 9 |
| b | 6 |
| - . \ " ' , | Replaced by space |

As shown in Table 1, when the processor 104 determines that the obtained first test result includes a character string corresponding to the preset recognition result "tps", the processor 104 finds the preset correction result "fps" corresponding to the preset recognition result, and replaces the character string with this preset correction result "fps" to generate the second test result. For another example, when the processor 104 determines that the obtained first test result includes a character string corresponding to the preset recognition result "fps", the processor 104 finds the preset correction result "fps:" corresponding to the preset recognition result, and replaces the character string with this preset correction result "fps:" to generate the second test result. Moreover, when the processor 104 determines that the obtained first test result includes a character string corresponding to the preset recognition results like "-", ".", "\\", """, """, and ",", the processor 104 finds the preset correction result (i.e., blank) corresponding to the preset recognition result, and replaces the character string with the preset correction result to generate the second test result.

In some embodiments, the processor 104 can control the image-capturing device 110 to further capture a second test image of the display screen 120a of the display device 120 to be tested according to a previously determined image-capturing parameter (for example, an exposure value of −11). After that, the processor 104 extracts a fourth image area corresponding to the reference image area from the second test image, and performs a text dividing operation on the fourth image area to convert the fourth image area into a fifth image area. Next, the processor 104 performs the text recognition operation on the fifth image area to obtain a third test result corresponding to the second test image. For details of these operations, reference may be made to the description of the previous embodiment, which is not repeated here.

In short, the processor 104 may repeatedly execute steps S220 to S240 until the required number of test images and corresponding test results have been obtained, but it is not limited thereto.

In summary, the embodiments of the disclosure first adjust the image-capturing parameters of the image-capturing device to an appropriate configuration based on whether a reference image area including the first designated character string exists in the captured image, so as to capture subsequent test images accordingly. Moreover, the disclosure suitably divides the text in the first image area through a text dividing operation after finding the first image area corresponding to the reference image area from the test image, so as to improve the quality of subsequent recognition. In addition, the disclosure may also adaptively replace the error recognition result in the first test result based on the text correction table to generate a more correct second test result. In this way, the reliability of automated testing may be increased accordingly.

Although the disclosure has been disclosed in the above embodiments, they are not meant to limit the disclosure. Anyone with common, general knowledge in the art can make changes and modifications without departing from the spirit and scope of the disclosure. The scope of the disclosure shall be determined by the scope of the claims attached.

What is claimed is:

1. A test result recognizing method adapted for a test result recognizing device, the method comprising:
controlling an image-capturing device to capture a first image of a display screen of a display device to be tested according to at least one image-capturing parameter, wherein the display screen of the display device to be tested comprises a first designated character string;
performing an optical character recognition operation on the first image to find a plurality of text image areas in the first image, wherein each of the text image areas comprises at least one character string;
in response to determining that the at least one character string in a first text image area of the text image areas comprises the first designated character string, determining that the first text image area is a reference image area in the first image; and
in response to determining that the at least one character string in each of the text image areas does not comprise the first designated character string, determining that image areas comprising the first designated character string do not exist in the first image;
in response to determining that the reference image area comprising the first designated character string exists in the first image, controlling the image-capturing device to capture a first test image of the display screen of the display device to be tested according to the at least one image-capturing parameter;
extracting a first image area corresponding to the reference image area from the first test image, and performing a text dividing operation on the first image area to convert the first image area into a second image area; and
performing a text recognition operation on the second image area to obtain a first test result corresponding to the first test image.

2. The method according to claim 1, wherein in response to determining that image areas comprising the first designated character string do not exist in the first image, the method further comprises:
adjusting the at least one image-capturing parameter of the image-capturing device, and controlling the image-capturing device to capture a second image of the display screen of the display device to be tested according to the at least one image-capturing parameter;
in response to determining that the reference image area comprising the first designated character string exists in the second image, controlling the image-capturing device to capture the first test image of the display screen of the display device to be tested according to the at least one image-capturing parameter.

3. The method according to claim 1, wherein a first relative position of the reference image area and the first image corresponds to a second relative position of the first image area and the first test image.

4. The method according to claim 1, wherein the first image area comprises a plurality of pixel columns, and performing the text dividing operation on the first image area to convert the first image area into the second image area comprises:
finding at least one first pixel column among the pixel columns, wherein the respective first pixel column comprises a plurality of pixels, and only a single first specific pixel among the pixels in the respective first pixel column has a first designated color;
finding at least one second specific pixel among the first specific pixel in the respective first pixel column, wherein adjacent pixels on both sides of the respective second specific pixel have the first designated color;
finding at least one third specific pixel among the at least one second specific pixel, wherein a specific pixel column exists on a designated side of the respective third specific pixel, the specific pixel column is separated from the corresponding third specific pixel by a predetermined number of rows, and the specific pixel column comprises N consecutive pixels with the first designated color, and N is a positive integer; and
replacing the respective third specific pixel with a second designated color different from the first designated color.

5. The method according to claim 1, wherein the first image area comprises a plurality of pixel columns, and performing the text dividing operation on the first image area to convert the first image area into the second image area comprises:
finding at least one first pixel column among the pixel columns, wherein the respective first pixel column comprises a plurality of pixels, only a single first specific pixel of the pixels in the respective first pixel column has a first designated color, and the first specific pixel of the respective first pixel column has 8 surrounding pixels;
diving the surrounding pixels of the first specific pixel in the respective first pixel column into a first group and a second group, and finding at least one fourth specific pixel among the first specific pixel in the respective first pixel column accordingly, wherein only one designated surrounding pixel in the second group corresponding to the respective fourth specific pixel has the first designated color; and
replacing the respective fourth specific pixel with a second designated color different from the first designated color.

6. The method according to claim 1, wherein after obtaining the first test result corresponding to the first test image, the method further comprises:
correcting the first test result to a second test result based on a text correction table.

7. The method according to claim 6, wherein the text correction table comprises a plurality of preset error recognition results and a plurality of corresponding preset correction results, and correcting the first test result to the second test result based on the text correction table comprises:
in response to determining that the first test result comprises a character string corresponding to a first preset recognition result among the preset correction results, finding the first preset correction result corresponding to the first preset recognition result among the preset correction results; and
replacing the character string with the first preset correction result to generate the second test result.

8. The method according to claim 1, further comprising:
controlling the image-capturing device to capture a second test image of the display screen of the display device to be tested according to the at least one image-capturing parameter;

extracting a fourth image area corresponding to the reference image area from the second test image, and performing the text dividing operation on the fourth image area and converting the fourth image area into a fifth image area; and performing the text recognition operation on the fifth image area to obtain a third test result corresponding to the second test image.

9. A test result recognizing device, comprising:
a non-temporary storage circuit, adapted to store a code;
a processor, coupled to the non-transitory storage circuit, and adapted to access the code to:
  control an image-capturing device to capture a first image of a display screen of a display device to be tested according to at least one image-capturing parameter, wherein the display screen of the display device to be tested comprises a first designated character string;
  performing an optical character recognition operation on the first image to find a plurality of text image areas in the first image, wherein each of the text image areas comprises at least one character string;
  in response to determining that the at least one character string in a first text image area of the text image areas comprises the first designated character string, determining that the first text image area is a reference image area in the first image; and
  in response to determining that the at least one character string in each of the text image areas does not comprise the first designated character string, determining that image areas comprising the first designated character string do not exist in the first image;
  in response to determining that the reference image area comprising the first designated character string exits in the first image, control the image-capturing device to capture a first test image of the display screen of the display device to be tested according to the at least one image-capturing parameter;
  extract a first image area corresponding to the reference image area from the first test image, and perform a text dividing operation on the first image area to convert the first image area into a second image area; and
  perform a text recognition operation on the second image area to obtain a first test result corresponding to the first test image.

10. The test result recognizing device according to claim 9, wherein in response to determining that image areas comprising the first designated character string do not exist in the first image, the processor further performs:
  adjusting the at least one image-capturing parameter of the image-capturing device, and controlling the image-capturing device to capture a second image of the display screen of the display device to be tested according to the at least one image-capturing parameter;
  in response to determining that the reference image area comprising the first designated character string exists in the second image, controlling the image-capturing device to capture the first test image of the display screen of the display device to be tested according to the at least one image-capturing parameter.

11. The test result recognizing device according to claim 9, wherein a first relative position of the reference image area and the first image corresponds to a second relative position of the first image area and the first test image.

12. The test result recognizing device according to claim 9, wherein the first image area comprises a plurality of pixel columns, and the processor performs:
  finding at least one first pixel column among the pixel columns, wherein the respective first pixel column comprises a plurality of pixels, and only a single first specific pixel among the pixels in the respective first pixel column has a first designated color;
  finding at least one second specific pixel among the first specific pixel in the respective first pixel column, wherein adjacent pixels on both sides of the respective second specific pixel have the first designated color;
  finding at least one third specific pixel among the at least one second specific pixel, wherein a specific pixel column exists on a designated side of the respective third specific pixel, the specific pixel column is separated from the corresponding third specific pixel by a predetermined number of rows, and the specific pixel column comprises N consecutive pixels with the first designated color, and N is a positive integer; and
  replacing the respective third specific pixel with a second designated color different from the first designated color.

13. The test result recognizing device according to claim 9, wherein the first image area comprises a plurality of pixel columns, and the processor performs:
  finding at least one first pixel column among the pixel columns, wherein the respective first pixel column comprises a plurality of pixels, only a single first specific pixel of the pixels in the respective first pixel column has a first designated color, and the first specific pixel of the respective first pixel column has 8 surrounding pixels;
  diving the surrounding pixels of the first specific pixel in the respective first pixel column into a first group and a second group, and finding at least one fourth specific pixel among the first specific pixel in the respective first pixel column accordingly, wherein only one designated surrounding pixel in the second group corresponding to the respective fourth specific pixel has the first designated color; and
  replacing the respective fourth specific pixel with a second designated color different from the first designated color.

14. The test result recognizing device according to claim 9, wherein after obtaining the first test result corresponding to the first test image, the processor further performs:
  correcting the first test result to a second test result based on a text correction table.

* * * * *